(12) United States Patent
Finn

(10) Patent No.: US 6,715,720 B2
(45) Date of Patent: Apr. 6, 2004

(54) CLIP FIXTURE HAVING PREFERENTIAL COLLAPSE FEATURE

(75) Inventor: Arnold H. Finn, Farmington, CT (US)

(73) Assignee: Taco Products, Inc., Plainville, CT (US)

( * ) Notice: Subject to any disclaimer, the term of this patent is extended or adjusted under 35 U.S.C. 154(b) by 0 days.

(21) Appl. No.: 09/829,260

(22) Filed: Apr. 9, 2001

(65) Prior Publication Data

US 2002/0145085 A1 Oct. 10, 2002

(51) Int. Cl.[7] .................................................. F16B 15/00
(52) U.S. Cl. .................... 248/71; 248/74.1; 248/317; 248/493; 248/497
(58) Field of Search .................... 248/490, 493, 248/497, 304, 301, 317, 49, 71; 74/502.4

(56) References Cited

U.S. PATENT DOCUMENTS

| | | | | |
|---|---|---|---|---|
| 1,772,687 A | * | 8/1930 | Reinke | 24/129 R |
| 1,921,797 A | * | 8/1933 | Armie | 248/69 |
| 3,376,004 A | * | 4/1968 | Goldman | 248/74.3 |
| 3,575,371 A | * | 4/1971 | Carlstedt | 248/215 |
| 3,906,592 A | * | 9/1975 | Sakasegawa et al. | 248/68.1 |
| 3,995,795 A | * | 12/1976 | Hogan | 248/68.1 |
| 4,127,316 A | * | 11/1978 | McKee et al. | 439/468 |
| 4,183,485 A | * | 1/1980 | Gladieux | 248/68.1 |
| D257,948 S | * | 1/1981 | Klingensmith | D8/373 |
| 4,441,677 A | * | 4/1984 | Byerly | 248/74.3 |
| 4,535,960 A | * | 8/1985 | Downing et al. | 248/74.5 |
| 5,178,503 A | * | 1/1993 | Losada | 411/441 |
| 5,423,646 A | * | 6/1995 | Gagnon | 411/184 |
| 6,508,442 B1 | * | 1/2003 | Dolez | 248/74.1 |

FOREIGN PATENT DOCUMENTS

| | | | |
|---|---|---|---|
| DE | 508805 | * | 5/1930 |
| FR | 1480386 | * | 5/1967 |
| NO | 0090780 | * | 1/1958 |

* cited by examiner

Primary Examiner—Anita King
(74) Attorney, Agent, or Firm—Ira S. Dorman

(57) ABSTRACT

A U-shaped fixture for supporting a wire hanger has an arm portion that is sufficiently narrow to render it preferentially collapsible under nail-driving force, thereby to maintain the open condition of its arcuate back portion. The reduced dimensions of the arm portion, and/or of a transition portion between the arm portion and the back portion, also contribute to the free multidirectional swiveling of an attached hanger.

10 Claims, 1 Drawing Sheet

CLIP FIXTURE HAVING PREFERENTIAL COLLAPSE FEATURE

BACKGROUND OF THE INVENTION

Numerous forms of clip fixtures are known in the art for attaching a wide variety of separate members, such as wire hangers for suspended ceilings, pipes and other conduits, cables, and the like. Generally, such fixtures are fastened to supporting surfaces by nails that extend through apertures provided, the nail desirably being preassembled with the fixture and held in position, for driving, either by an integral element (e.g., frictionally engaged in an aperture) or by a separate element (e.g., a tubular eyelet engaged on the nail).

Typical of prior art in the broad field of the invention are U.S. Pat. Nos. 4,903,920, 4,915,561, 5,178,503, and 5,624,220.

One conventional form of clip fixture comprises a U-shaped member having a nail frictionally engaged and retained in an aperture through one of its arms and aligned with an aperture through the other arm, for being driven (by either manual or automatic means) into mounting structure. In driving the nail to install such a fixture the impact of the hammer tends not only to close the space between the arms but also to decrease substantially the space between opposing elements of the arcuate back portion. The resultant constriction tends to hamper the insertion of a wire hanger or the like; moreover, excessive collapse of the back portion will undesirably constrain a tied wire loop against free universal (or at least multidirectional) movement about the fixture.

SUMMARY OF THE INVENTION

Accordingly, broad objects of the present invention are to provide a novel, nail-mountable fixture which is highly effective for its intended purposes and convenient and facile to install, and a novel and readily produced assembly comprising such a fixture.

More specific objects of the invention are to provide such a fixture and assembly whereby and wherein a supporting hanger or the like is substantially freely movable, and a fastening nail is held firmly in position for ready driving.

Additional specific objects of the invention are to provide a fixture and fixture assembly having the foregoing features and advantages, which fixture and assembly are of relatively simple construction and inexpensive manufacture, and nevertheless exhibit high levels of strength and permanence.

It has now been found that certain of the foregoing and related objects of the invention are attained by the provision of a generally U-shaped fixture, fabricated from a non-resiliently deformable metal and having a preferential-collapse feature. The fixture comprises a relatively wide back portion of open, arcuate cross-sectional configuration, and a pair of arm portions extending forwardly from the back portion and having aligned fastener-receiving apertures formed therethrough; the arm portions will generally be parallel to one another, as viewed in two orthogonal planes. At least one of the arm portions has a zone of reduced cross section adjacent the back portion, and is preferably joined thereto by a transition portion, desirably comprised of convergent shoulder elements. Force applied to drive the mounting nail will cause the one arm portion to deform preferentially to the back portion, thereby permitting the latter to maintain substantially its open, arcuate cross-sectional configuration against the deforming force.

In certain embodiments the zone of reduced cross section will extend along at least most of the length of the one arm portion. The one arm portion will desirably be of the same thickness as the back portion, but of lesser width; i.e., the back portion will advantageously be about 1.5 times the width of the one arm portion, or wider. The fixture will usually be made of steel, and integrally formed as a single piece.

Other objects of the invention are attained by the provision of an assembly comprising the fixture described, and a nail or other similar fastener having a shank with a leading end portion frictionally retained in the aperture of the one arm portion. The assembly may additionally include a wire hanger member having an open loop portion through which the fixture extends. The relative dimensions and configuration of the loop portion may be such that substantially free multidirectional swiveling movement of the hanger member cannot occur about the back portion of the installed fixture, but can occur about the reduced cross section zone of the one arm portion.

DETAILED DESCRIPTION OF THE ILLUSTRATED EMBODIMENTS

Figure 2:
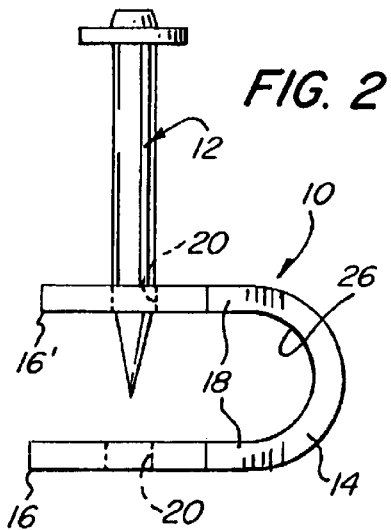
FIG. 2 is a side elevational view of an assembly embodying the invention, comprising the fixture of FIG. 1 and showing the nail in its "pre-shot" state.
Figure 1:
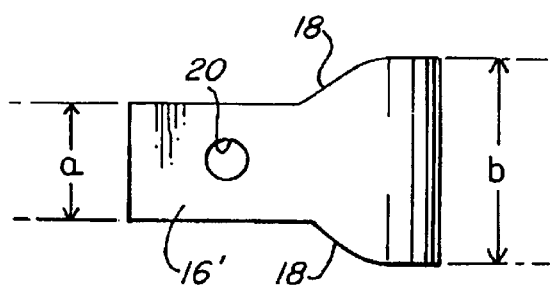
FIG. 1 is a plan view of a fixture embodying the present invention, which is symmetrical about two orthogonal planes.
Figure 3:
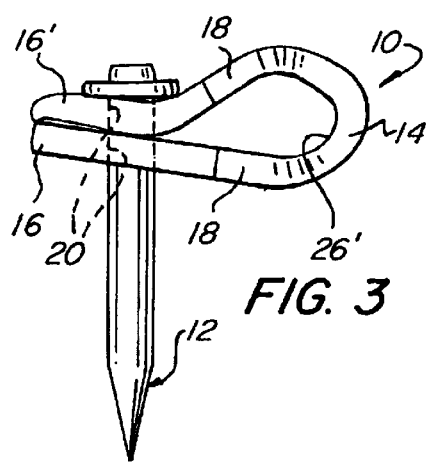
FIG. 3 is a view similar to FIG. 2, showing the nail in a driven state.

Turning initially to FIGS. 1–3 of the drawing, the fixture assembly illustrated consists of U-shaped fixture, generally designated by the numeral 10 and integrally formed as a single piece, and a nail, generally designated by the numeral 12. The fixture 10 consists of an arcuate back portion 14 and a pair of arms 16 extending forwarding therefrom, the arms being parallel as viewed on two orthogonal planes (i.e., in FIGS. 1 and 2). A pair of convergent shoulders 18 provide a transition between the back portion 14 and each arm 16, and aligned apertures 20 are formed through the arms 16; the point of the nail 12 is frictionally engaged in one of the apertures 20.

As will readily be appreciated, the fixture assembly is installed by driving the nail 12 through both apertures 20 and into mounting structure (not illustrated). As will also be appreciated from a comparison of the pre-shot and post-shot conditions depicted in FIGS. 2 and 3, respectively, the impact delivered to drive the nail 12 transfers force to the uppermost of the arms 16 (as depicted) in which the nail 12 is engaged, causing it to move into contact with the lower arm 16. Because the width "a" of the arms 16 is substantially less than is the width "b" of the back portion 14, the upper most arm 16' collapses preferentially to (i.e., rather than) the back portion. As a result, the space 26' defined within the arcuate back portion 14 in the post-shot condition is of substantially the same cross sectional area as in the pre-shot condition.

Figure 4:
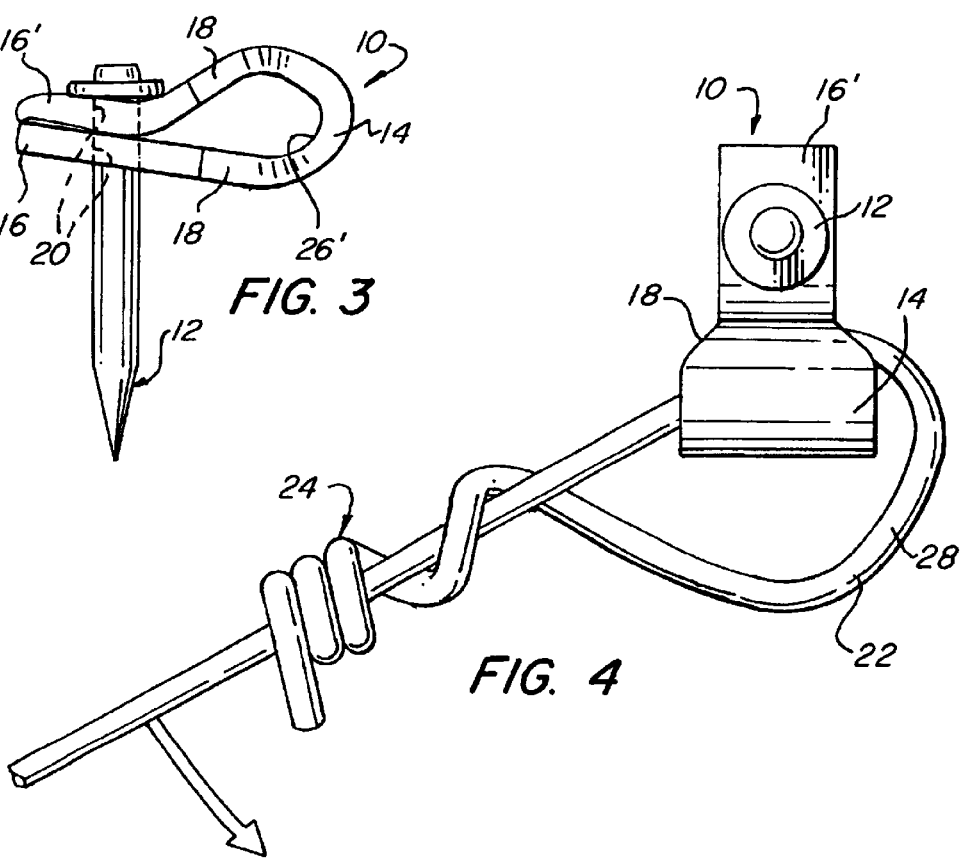
FIG. 4 is a plan view of the assembly of FIGS. 2 and 3, additionally including a tied wire hanger.

Turning now in greater detail to FIG. 4, although the loop portion 22 of the tied wire hanger, generally designated by the numeral 24, is sufficiently open to permit limited movement within to the fixture 10, it will be appreciated that the relative narrowness of the space that is bounded by at least certain sections, e.g., the section at 28, would cause the loop to engage and bind upon the ends of the back portion of the fixture (i.e., the spacing is less than the dimension "b") if, for example, the hanger 24 were swiveled in the direction indicated by the arrow. Because however the loop portion 22 can be displaced to align with the tapered shoulders 18 and/or the narrow arms 16, and because the space 26' within the back portion of the driven fixture permits adequate displacement, swiveling in the indicated direction, as well as in other directions, is enabled.

While the lower arm is essentially identical to the upper arm, it does not normally deform because it is supported and backed by underlying (e.g., overhead) mounting structure. Manufacture and/or use of the fixture is however facilitated significantly by making the arms substantially identical (and indeed, by making the fastener symmetrical, as illustrated), and hence such a construction is preferred.

Also, although the arms of the fixture will desirably be relatively and uniformly narrow along their entire length, it is necessary only that a weakened area or section be provided about which one of the arms can deform in preference to the back portion. Specific dimensions for the back portion and the weakened area of the fixture, as well as the relative strength levels afforded, will be evident to those skilled in the art from the discription herein set forth. By way of non-limiting example, however, the illustrated embodiment of the fixture may advantageously be fabricated from steel of nominal 1/16 inch thickness, with an arcuate back portion curved on a radius of about 3/8 inch and about 5/8 inch wide, and with arm portions that are about 3/8 inch wide and 1/2 inch long, joined by a transition section defined by 45° shoulder elements. The shoulder elements may of course be formed at other angles, and may indeed be contoured (rather than being rectilinear). In any event the transition portion ensures that a zone of reduced width will remain open even if the arm portions collapse into contact with one another along their entire lengths, and therefore comprises a preferred embodiment of the fixture.

Thus, it can be seen that the present invention provides a novel, nail-mountable fixture that is highly effective for its intended purposes and convenient and facile to install, as well as a novel and readily produced assembly comprising such a fixture. A supporting hanger or the like is substantially freely movable in the fixture, and a fastening nail is firmly held in position thereby for ready driving. The fixture and assembly are in addition of relatively simple construction and inexpensive manufacture, and nevertheless exhibit high levels of strength and permanence.

Having thus described the invention, what is claimed is:

1. A generally U-shaped fixture constructed for supporting a wire hanger for substantially free swinging movement, said fixture being fabricated from a nonresiliently deformable metal and comprising a relatively wide back portion of open, continuously arcuate cross-sectional configuration defining a laterally extending passage and being devoid of structure projecting into said passage; a pair of arm portions extending forwardly from said back portion and having aligned fastener-receiving apertures formed therethrough; and at least one transition portion joining at least one of said arm portions to said back portion and comprising a zone of relative weakness adjacent said back portion, which zone of relative weakness is of reduced cross section relative to said back portion, said at least one transition portion and said arm portions extending continuously from said back portion in planes tangential thereto; whereby force applied to deform said arm portions toward one another will cause said one arm portion to deform preferentially to said back portion, thereby permitting said back portion to maintain substantially said open, arcuate cross-sectional configuration against such deforming force.

2. The fixture of claim 1 wherein said zone of reduced cross section is of the same thickness as said back portion, and of lesser width.

3. The fixture of claim 2 wherein the total width of elements comprising said back portion is at least about 1.5 times the total width of elements comprising said at least one arm portion.

4. The fixture of claim 1 wherein said transition portion is comprised of a pair of generally convergent shoulders.

5. The fixture of claim 1 wherein a second said transition portion, disposed in said tangential plane, joins the other of said arm portions to said back portion.

6. The fixture of claim 1 wherein said arm portions are substantially parallel to one another, viewed along two orthogonal planes.

7. The fixture of claim 1 wherein said fixture is integrally formed from a single piece of steel.

8. An assembly comprising the fixture of claim 1 and a fastener that is drivable by hammering force, said fastener having a shank with a leading end portion frictionally retained in said aperture through said one arm portion and in registry with said aperture through the other arm portion, whereby said fastener can be driven, by force applied to a trailing end portion of said shank, through said apertures and into a mounting structure.

9. The assembly of claim 8 wherein said fastener is a nail.

10. The assembly of claim 8 additionally including a wire hanger member having an open loop portion through which said fixture extends, the relative dimensions and configuration of said loop portion being such as to prevent substantially free multidirectional swinging movement of said hanger member about said back portion of said fixture while permitting such movement about at least said zone of reduced cross section of said one arm portion.

* * * * *

UNITED STATES PATENT AND TRADEMARK OFFICE
CERTIFICATE OF CORRECTION

PATENT NO. : 6,715,720 B2
DATED : April 6, 2004
INVENTOR(S) : Arnold H. Finn

It is certified that error appears in the above-identified patent and that said Letters Patent is hereby corrected as shown below:

Column 2,
Line 39, after the word "of," please insert the article -- a --.
Line 45, please insert (before the sentence beginning "A pair of ...") the sentence: -- As can be seen from Figure 2, the back portion defines a laterally extending passage or space 26 devoid of structure projecting thereinto. --

Signed and Sealed this

Fourth Day of January, 2005

JON W. DUDAS
*Director of the United States Patent and Trademark Office*